UNITED STATES PATENT OFFICE.

N. SPENCER THOMAS, OF PAINTED POST, NEW YORK.

IMPROVED PROCESS FOR MAKING EXTRACTS.

Specification forming part of Letters Patent No. 57,217, dated August 14, 1866.

*To all whom it may concern:*

Be it known that I, N. SPENCER THOMAS, of Painted Post, New York, have invented a new and Improved Process for Making Concentrated Extracts; and I do hereby declare that the following is a full, clear, and exact description thereof, which will enable others skilled in the art to make and use the same, reference being had to the accompanying drawing, forming part of this specification.

This invention consists in the application or use of jets of air injected at or through the bottom of a vacuum-pan in which the concentration of extract or other substance is to be effected, in such a manner that by said jets of air the moisture contained in the extract is completely expelled and a solid extract can be made before removing it from the pan, and without any mechanical contrivance for stirring or agitating the extract or other substance.

In the ordinary process of concentrating extracts or other substance a vacuum-pan is employed in which the substance to be concentrated is boiled down. When the extract approaches completion it gets thick and tenacious, so that further evaporation ceases, and if the extract is to be brought in a solid form it must be subjected to a separate operation at much expense of time and labor.

By my process of injecting jets of air at or through the bottom of the vacuum-pan the substance to be concentrated is kept in a state of agitation, and the evaporation continues until all the moisture is expelled. By these means I am enabled to produce solid extracts with comparatively little labor or loss of time, and without subjecting the substance to be concentrated to a separate operation.

What I claim as new, and desire to secure by Letters Patent, is—

The within-described process of concentrating extracts or other substances by the action of jets of air injected at or through the bottom of the vacuum-pan in which the evaporation of said substance is to be effected, substantially as set forth.

N. SPENCER THOMAS.

Witnesses:
   JNO. DAY,
   JAMES M. SMITH.